US011841840B2

(12) United States Patent
Kruempelmann et al.

(10) Patent No.: US 11,841,840 B2
(45) Date of Patent: Dec. 12, 2023

(54) TECHNICAL SYSTEM SETTINGS USING A SHARED DATABASE

(71) Applicant: SAP SE, Walldorf (DE)

(72) Inventors: Wulf Kruempelmann, Altlussheim (DE); Susanne Schott, Mannheim (DE); Georg Storz, Hessigheim (DE)

(73) Assignee: SAP SE, Walldorf (DE)

( * ) Notice: Subject to any disclaimer, the term of this patent is extended or adjusted under 35 U.S.C. 154(b) by 127 days.

(21) Appl. No.: 17/117,972

(22) Filed: Dec. 10, 2020

(65) Prior Publication Data
US 2022/0188282 A1 Jun. 16, 2022

(51) Int. Cl.
*G06F 16/21* (2019.01)
*G06F 16/22* (2019.01)
*G06F 16/2455* (2019.01)
*G06F 16/23* (2019.01)
*G06F 9/455* (2018.01)
*G06F 16/27* (2019.01)

(52) U.S. Cl.
CPC ........ *G06F 16/217* (2019.01); *G06F 9/45558* (2013.01); *G06F 16/2282* (2019.01); *G06F 16/2379* (2019.01); *G06F 16/24558* (2019.01); *G06F 16/27* (2019.01); *G06F 2009/45595* (2013.01)

(58) Field of Classification Search
None
See application file for complete search history.

(56) References Cited

U.S. PATENT DOCUMENTS

| 11,347,878 | B2 * | 5/2022 | Beecham | G06F 16/9024 |
|---|---|---|---|---|
| 2013/0238641 | A1 * | 9/2013 | Mandelstein | G06F 16/27 |
| | | | | 707/E17.014 |
| 2013/0290295 | A1 * | 10/2013 | Soules | G06F 16/27 |
| | | | | 707/E17.032 |
| 2014/0279849 | A1 * | 9/2014 | Zhang | G06F 16/2282 |
| | | | | 707/609 |
| 2015/0347484 | A1 * | 12/2015 | Klauke | G06F 16/221 |
| | | | | 707/741 |
| 2018/0329967 | A1 * | 11/2018 | Lee | G06F 16/27 |
| 2020/0193324 | A1 * | 6/2020 | Zhao | G06F 16/285 |
| 2021/0141602 | A1 * | 5/2021 | Lieber-Dembo | G06F 16/2282 |
| 2021/0240690 | A1 * | 8/2021 | Cseri | G06F 16/221 |
| 2021/0349795 | A1 * | 11/2021 | Sangala | G06F 11/327 |

* cited by examiner

*Primary Examiner* — Kris E Mackes
*Assistant Examiner* — Cao D Vuong
(74) *Attorney, Agent, or Firm* — Mintz Levin Cohn Ferris Glovsky and Popeo, P.C.

(57) ABSTRACT

In some implementations, there is provided a method including receiving, by a centralized controller, data from a plurality of database tables at a plurality of database instances at a cloud service, wherein the data is received via a plurality of database views on the plurality of database tables; in response to receiving the data, performing, by the centralized controller, a union view of the data obtained from the plurality of database views; storing, by the centralized controller, the union view of the data as configuration metadata; and performing, by the centralized controller, at least one calculation view to update a value of the configuration metadata and to provide the updated value to at least one of the plurality of database tables at the cloud service. Related systems and articles of manufacture are also disclosed.

14 Claims, 4 Drawing Sheets

Receive data from one or more database views of at least one table at an application instance of a cloud service 302

Perform a union view to combine the data from the database views 304

Persist the output of the union view to provide configuration metadata 306

Perform an attribute view of the configuration metadata 308

Determine, based on a calculation view, an updated configuration value to provide to at least one database table at an application instance of a cloud service 310

TECHNICAL SYSTEM SETTINGS USING A SHARED DATABASE

TECHNICAL FIELD

This disclosure relates generally to configuring and/or deploying applications in a cloud based environment.

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud based service including, for example, a software as a service (SaaS) and/or the like.

SUMMARY

In some implementations, there is provided a method including receiving, by a centralized controller, data from a plurality of database tables at a plurality of database instances at a cloud service, wherein the data is received via a plurality of database views on the plurality of database tables; in response to receiving the data, performing, by the centralized controller, a union view of the data obtained from the plurality of database views; storing, by the centralized controller, the union view of the data as configuration metadata; and performing, by the centralized controller, at least one calculation view to update a value of the configuration metadata and to provide the updated value to at least one of the plurality of database tables at the cloud service.

In some variations, one or more of the features disclosed herein including the following features can optionally be included in any feasible combination. A request for monitoring information regarding the plurality of database instances at the cloud service may be received from a client device. The centralized controller may provide a response including the monitoring information. An indication may be received from the client device, wherein the indication modifies a setting of at least one of the database instances at the cloud server. In response to the indication, the plurality of database views may be triggered to obtain the data from the plurality of database tables at the cloud service. The setting may vary at least one of a memory allocation, a bandwidth of network interface, a storage amount, a processor capacity, or a virtual machine configuration. The triggering the plurality of database views may further include triggering an odata protocol command to obtain the data from the plurality of database tables. The plurality of database instances may be hosted at a plurality of cloud services. The data from the plurality of database tables may include a first system identifier that identifies a first database instance and first configuration data associated with the first database instance and a virtual machine hosting the first database instance. The updated value may be provided to at least one of the plurality of database tables via an odata protocol. The configuration metadata may be stored in a database table at the centralized controller. The attribute view may select the subset of the configuration metadata based on an identifier provided by a client device accessing the centralized controller. The centralized controller may perform an attribute view on the configuration metadata to select a subset of the configuration metadata, wherein the at least one calculation view is performed based on the subset of the configuration metadata.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Database systems may be extremely complicated and their development, test, and deployment may also be complex. For example, a first instance of a database system may have a certain configuration that is different from another configuration being used for a second instance of the database system. These differences not only make deployment of the instances to cloud services difficult but it also makes development and testing difficult. And, these differences make configuration of each instance prone to errors (which reduces consistency and reproducibility).

In the case of databases, database instances may each be deployed on virtual machines at a cloud based platform. These database instances may have data (e.g., data for configuring a database instance or other types of data required for operation of the database instance) that is common to a group, if not all, of the database instances. The database instances may have other data that is unique or specific to each of the database instances. In the case of the common data, it may be shared among the database instances. These database instances may require a large variety and quantity of data such as configuration data (also referred to as technical settings). The configuration data may include, for example, memory settings, memory allocation, bandwidth of network interfaces, URLs to services, processor capacity settings, storage settings, security settings, white lists to allowed URL destinations or external services, initial data sets, and/or the like.

In some example embodiments, there is provided a sharing mechanism of repository data for central management of data for configuring the database instances. In some example embodiments, a database view may be created in a shared database. The managed systems, such as the database instances deployed on virtual machines on a cloud based platform, are controlled, at least in part, by a centralized controller using the database view.

Figure 1:
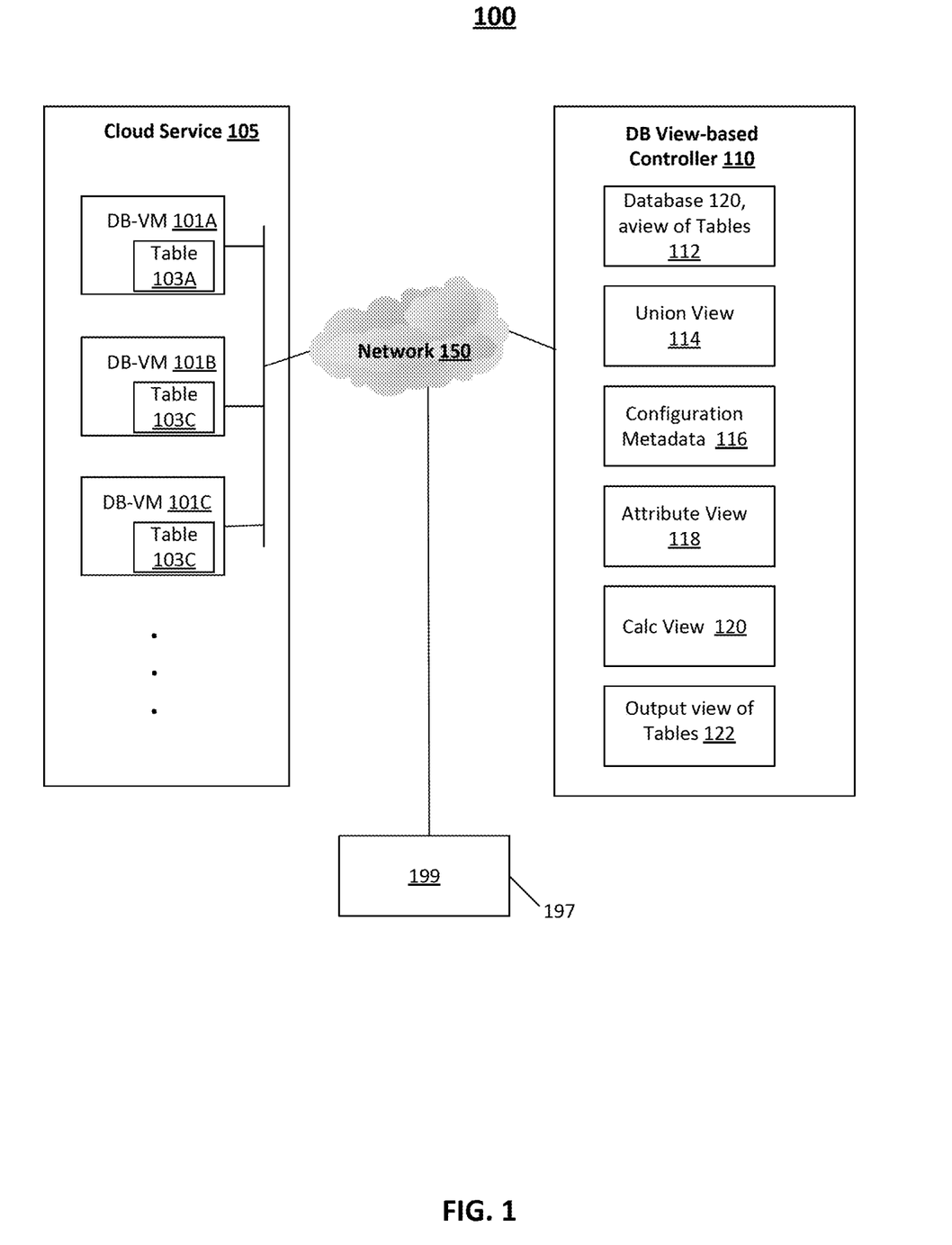
FIG. 1 illustrates an example of a system including a controller, in accordance with some implementations of the current subject matter.

FIG. 1 depicts an example of a system 100 including a cloud service 105. The cloud service may include a plurality of database instances executed on virtual machine 101A-C, which are hosted on one or more physical machines of the provider of the cloud service. The cloud service may be a public cloud service, a private cloud service, and/or an on-premise cloud service. In the example of FIG. 1, each of the database instances 101A-C includes at least one database table 103A-C storing certain data, such as configuration data for configuring the database instance.

The system 100 may also include a controller 110 (labeled "DB View-based Controller") coupled via a network 150 to the cloud service 105. The controller 110 may obtain a database view of one or more of the database tables, such as the database tables 103A-C. The phrase "database view" refers to a result set of a pre-defined, stored query on the data of the database tables. In other words, the database view provides a pre-established query command on the tables 103A-C. The database view may be stored at the controller 110.

Although FIG. 1 depicts database instances, other types of application instances may be implemented at the cloud service and controlled by the controller 110 as well.

At 112, the database view of tables 103A-C provides, at the controller 110, database views of the database tables 103A-C. The database view may be considered virtual in the sense that the tables 103A-C are persisted at the cloud service 105, rather than the controller 110.

At 114, the database views of the tables 103A-C may be combined to provide a union view. The union view includes, as one virtual table, the data from tables 103A-C. For each of the database instances 101A-C including tables 103A-C, the union view may provide data, such as configuration data, for the database instances 101A-C. Moreover, the data may be identified by a system identifier (SID) that identifies the source database instance. For example, the union view may include a first SID that identifies database instance 101A and the corresponding data associated with database instance 101A, a second SID that identifies database instance 101B and the corresponding data associated with database instance 101B, a third SID that identifies database instance 101C and the corresponding data associated with database instance 101C, and so forth for any other database instances being managed by controller 110.

At 116, the union view may be persisted locally at the controller 110 as "configuration metadata" to provide a central repository of the configuration data for each of the database instances 101A-C being managed by the controller 110. The persisted data of the union view represents a database table including a union of the configuration data (e.g., system data, technical data, and/or the like) for configuring one or more of the database instances 101A-C. The persisted data may also include configuration data for configuring each of the corresponding virtual machines at 101A-C.

Table 1 below depicts an example of a portion of the configuration metadata stored by the controller 110 as a database table of a central repository. In the first column of Table 1, the data includes a system ID (SID) identifying the database instance 101A, a network ID identifying the cloud service hosting the database instance 101A, a role for the database instance 101A (e.g., a development instance, a test instance, and an end-user deployment instance), and system data, such as configuration data and other data, for configuring the database instance 101A. In the second column of Table 1, the data includes a system ID (SID) identifying the database instance 101B, a network ID identifying the cloud service hosting the database instance 101B, a role for the database instance 101B, and system data; in the third column of Table 1, the data includes a system ID (SID) identifying the database instance 101C, a network ID identifying the cloud service hosting the database instance 101C, a role for the database instance 101C, and system data for configuring the database instance 101C; and so forth for each database instance being managed by the controller 110.

TABLE 1

| System ID for DB at 101A | System ID for DB at 101B | System ID for DB at 101C |
| Network ID for DB at 101A | Network ID for DB at 101B | Network ID for DB at 101C |
| Role for DB at 101A | Role for DB at 101B | Role for DB at 101C |
| System data for DB at 101A | System data for DB at 101B | System data for DB at 101C |

The configuration metadata may include other types of system data, technical data and/or settings. For example, a group ID indicating a specific group of end-users of the database instances, a white list of allowed services, system usage information, other statistically relevant data, and/or the like.

At 118, an attribute view may be performed on the configuration metadata. The attribute view is a type of database view created to model descriptive attribute data. The attribute view may be used to select a subset (or select all) of the columns and rows of the configuration metadata table. For example, the attribute view may select, from the configuration metadata table persisted by the controller 110, attribute data for a group of database instances for configuration by the controller.

To illustrate further, database instances 102A-B may be associated with a network ID or a group ID indicating an end-user device requesting three times the amount of default storage, 4 times the amount of memory, and the like. In this example, the attribute view may be used to select the columns and rows of the configuration metadata table associated with, for example, database instances 102A-B associated with the network ID and/or group ID.

At 120, a calculation view is performed. The calculation view may be used to perform complex operations (e.g., using script, code, or other type of machine instructions). Examples of these complex operations include performing calculation logic, complicated database operations (e.g., joins, unions, projections, aggregation, such as sum, average, etc., as well as other types of operations), advanced SQL logic, and/or the like. These complex calculation vie operations may be performed outside (or, alternatively, inside) of the persistence layer of the database layer.

Referring again to the previous example of database instances 102A-B, the calculation view may take as an input the current or default setting (as indicated in the configuration metadata table or the attribute view of database instances 102A-B) for persistent storage and calculate as an output an updated storage value (e.g., setting) to configure each of the database instances. Continuing with the example, the calculation view may take as an input the current, default memory setting (as indicated in the configuration metadata table or the attribute view of database instances 102A-B) and calculate as an output an updated memory value to configure the memory allocated to each of the database instances. As the calculation view includes logic, if the memory setting received as an input to the calculation view already indicates the updated memory setting (e.g., 4 times the amount of memory), the calculation view logic may detect this condition and not make a change.

At 122, the output of the calculation view may be provided to the corresponding tables 103A-C to configure, or update, the configuration data of the database instances 101A-C Referring to again to the previous example of database instances 102A-B, the calculation view output (e.g., updated storage value setting, updated memory allocation setting, and/or the like) may be provided to the database tables 103A-B to configure the database instances 103A-B. Referring again to the previous example of database instances 102A-B, the calculation view may represent a query command that updates each of the database tables 103A-B with the updated storage value and updated memory allocation.

In some example embodiments, a client device 197 including a user interface 199 may couple to the controller 110. The user interface may display the configuration metadata 116, the attribute view 118, and/or the calculation view 120. For example, the client device 197 (which may be associated with an administrator or an end-user) may couple to the controller 110 and present the user interface 199. The user interface view may be used to monitor the current configuration metadata, and then modify one or more of the values of the configuration metadata. For example, the user interface may be used to increase the memory allocation to 8 times the default for a certain database instance. When this is the case, the calculation view may then modify the calculation logic that determines the memory allocation and output an updated memory allocation to, for example, the database instance 101A including the corresponding table 103A storing the configuration of the database instance.

Figure 2:
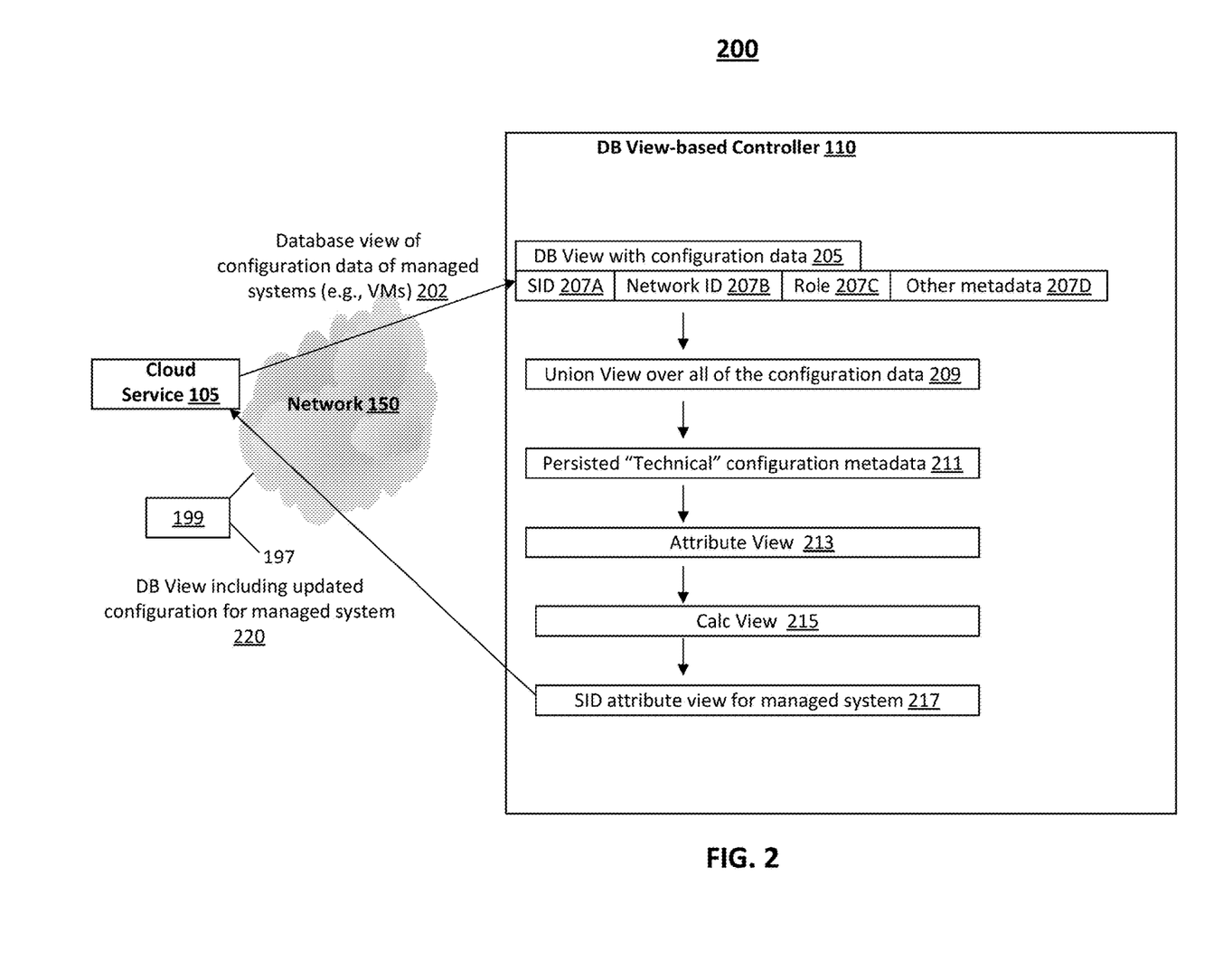
FIG. 2 illustrates another example of a system including a controller, in accordance with some implementations of the current subject matter.

FIG. 2 depicts another example of a system 200, in accordance with some example embodiments.

In the example of FIG. 2, the controller 110 receives, at 202, one or more database views of the tables 103A-C storing data (e.g., configuration data) of the managed systems, such as database instances 101A-C, at the cloud service 105. For each managed system, the database (PB) view configuration data 205 includes a SID 207A identifying the managed system, a network ID 207B, a role 207C, and/or other metadata 207D.

In some example embodiments, the odata protocol is used to perform the database view at 202. For example, the database view may include a "select" which is transferred into an odata call to the database tables 101A-C. The odata protocol allows the creation and consumption of queryable and interoperable: representational state transfer API. The odata protocol may utilize HTTP verbs to indicate the operations on the resources, such as GET (to get a resource), POST (to create a new resource), PUT (to update an existing resource by replacing it with a complete instance), PATCH (to update an existing resource by replacing part of its properties with a partial instance), and DELETE (to remove the resource).

At 209 the controller 110 may perform a union view for each managed system. The union view may be persisted by the controller and may include data obtained from the database views. At 211, the union view is persisted locally at, or stored remotely and accessible by, the controller 110 as "configuration metadata" stored in database tables to provide a central repository of the configuration data for each of the database instances 101A-C being managed by the controller 110. At 213, the attribute view may be performed in the same or similar way as noted above with respect to 118. And, a calculation view may be performed at 215 in the same or similar way as noted above with respect to 120. The output of the calculation view may then be used to update the configuration of the tables 103A-C using one or more database views 220. In some example embodiments, the database view 220 is via an odata protocol.

For a group of managed systems (hosted at cloud service 105) for example, the attribute view may be used to select the data from the configuration metadata. 211. On this attribute view, the calculation view may execute a stored procedure to create, update, read, or delete one or more configuration settings for the managed systems. The calculation view may also be used to provide, as an output, the one or more configuration settings for the managed systems (e.g., a query to database tables 103A-C to update the configuration values in those tables to reflect the updated configuration settings). As noted, the database view may be transformed into an odata protocol command when accessing the tables 103A-C. The use of database views may thus reduce the amount of persisted data at the controller 110. For example, the only data which needs to be persisted are the local data of the database tables 103A-C at the managed systems and the configuration metadata in the controller 110. The resulting data from the calculation view may represent the updates/changes to the configuration of the database instances, and this update/change data may not be persisted at the controller but locally at the database tables 103A-C of the managed systems. Moreover, if a change to a configuration occurs at a database table 103A for example, this may automatically result in a new calculation view and database view at 220.

Figure 3:
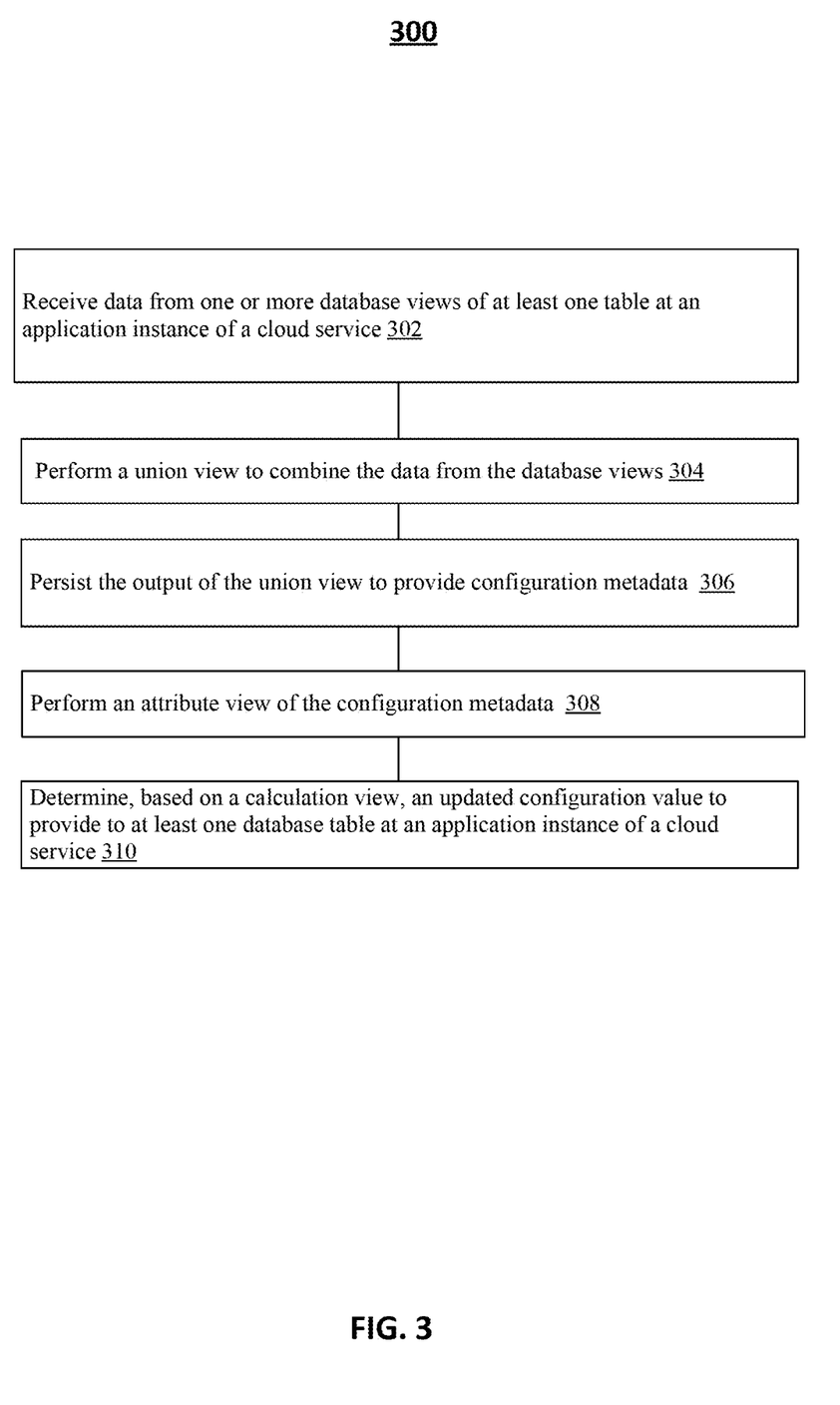
FIG. 3 illustrates an example of a process for using database views to configure managed systems in a cloud service, in accordance with some implementations of the current subject matter.

FIG. 3 depicts an example of a process 300 for configuring instances, in accordance with some example embodiments.

At 302, the controller 110 may receive data from one or more database views of tables 103A-C, in accordance with some example embodiments. These data from the database views may be provided via an odata service.

At 304, the controller may perform a union view of the database views received at 302. At 306, the union view may be persisted as "configuration metadata" to provide a central repository of the configuration metadata for each of the database instances 101A-C being managed by the controller 110. In some example embodiments, the configuration metadata may be stored in one or more database tables. The persisted union view may include data, such as configuration data for configuring and/or using the one or more of the database instances 101A-C.

At 308, the controller may perform an attribute view on the configuration metadata to select a subset (or select all) of the columns and rows of the configuration metadata table. For example, the user interface 199 may indicate that a subset of the database instances at the cloud service 105 require a larger memory allocation. In this example, the user interface may identify database instance 110A-C as the group, or subset, and may identify the amount of memory to be allocated to each database instance 110A-C. The attribute view may select, from the configuration metadata table persisted by the controller 110, attribute data associated with database instances 110A-C.

At 310, the controller may perform a calculation view. The calculation view receive as an input the attribute view of 308 and perform a complex operation. Returning to the previous example, the calculation view may select, from the configuration metadata, the memory allocation values for each database instance d then update that data to represent the larger amount of memory. The calculation view may also be used to generate an output. For example, the calculation view may output a query that replaces, at database tables 103A-C, the memory allocation values with the newly calculated memory allocation value. In some example embodiments, the database view nay output the updated replacement value in an odata complaint manner as noted above.

To illustrate further, the client device 199 may send a request to the controller 110 for monitoring information about the plurality of database instances at the cloud service. The controller may then respond by providing the monitoring information, which may include the current status and configuration information for the database instances (which is stored in the configuration metadata). The client device may then send instructions (or other indications) to modify one or more settings of at least one of the database instances at the cloud server. When the instructions are received by the controller, this may trigger the controller to retrieve the stored database view to obtain the data from the plurality of database tables and proceed 302-310 to update the settings at the database instances.

Figure 4:
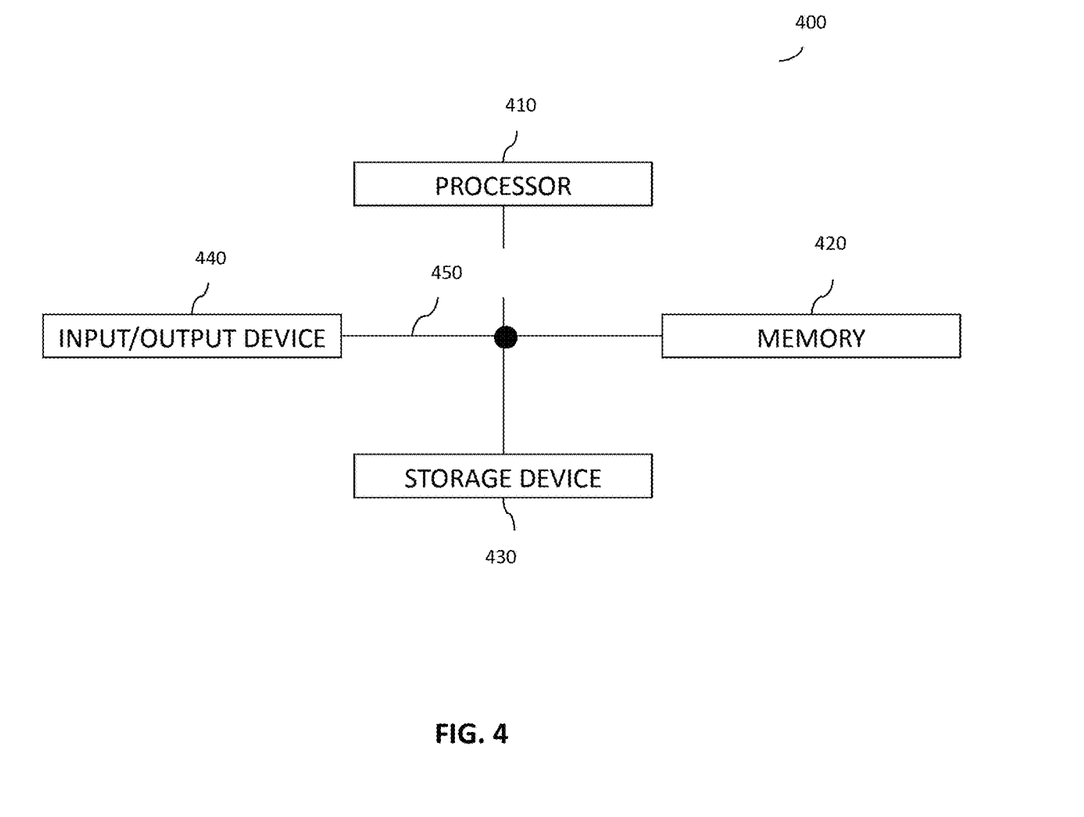
FIG. 4 is another example of a system, in accordance with some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid-state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

receiving, by a centralized controller and from a client device, an indication to modify a setting of at least one database instance of a plurality of database instances at a cloud service, wherein the setting varies, at the cloud service, at least one of a memory allocation for the at least one database instance or a processor capacity for the at least one database instance;

in response to receiving the indication, triggering, by the centralized controller, a plurality of database views to obtain configuration data from a plurality of database tables at the plurality of database instances at the cloud service, wherein each of the plurality of database tables provides the configuration data for configuring a corresponding one of the plurality of database instances, wherein each of the plurality of database views provides a pre-established query in a corresponding one of the plurality of database tables to enable reception of the configuration data used to modify the setting of the at least one database instance;

receiving, by the centralized controller, the configuration data from the plurality of database tables at the plurality of database instances at the cloud service, wherein the configuration data is received via the plurality of database views on the plurality of database tables;

in response to receiving the configuration data, performing, by the centralized controller, a union view of the configuration data obtained from the plurality of database views, wherein the union view of the configuration data forms a table of configuration metadata that includes, for each of the plurality of database instances, a system identifier identifying corresponding database instance, a network identifier identifying the cloud service, the configuration data for configuring the corresponding database instance, and a group identifier indicating a group of users associated with the database instances;

storing, by the centralized controller, the union view of the configuration data in the table of the configuration metadata;

performing, by the centralized controller, an attribute view on the configuration metadata to select, based at least on the group identifier associated with the at least one database instance being modified, a subset of the configuration metadata; and performing, by the centralized controller, at least one calculation view on the subset to modify a value of the configuration metadata and to provide the modified value to at least one of the plurality of database tables associated with the configuration of the at least one database instance at the cloud service.

2. The computer-implemented method of claim 1 further comprising:

receiving, from the client device, a request for monitoring information regarding the plurality of database instances at the cloud service;

providing, by the centralized controller, a response including the monitoring information; and wherein the plurality of database views are stored at the centralized controller.

3. The computer-implemented method of claim 1, wherein the setting varies at least one of a bandwidth of network interface, a storage amount, or a virtual machine configuration.

4. The computer-implemented method of claim 1, wherein the triggering the plurality of database views further comprises triggering an odata protocol command to obtain the configuration data from the plurality of database tables.

5. The computer-implemented method of claim 1, wherein the plurality of database instances are hosted at a plurality of cloud services.

6. The computer-implemented method of claim 1, wherein the updated value is provided to at least one of the plurality of database tables via an odata protocol.

7. The computer-implemented method of claim 1, wherein the configuration metadata is stored in a database table at the centralized controller.

8. A system comprising:
at least one processor; and
at least one memory including instructions, which when executed by the at least one processor, cause operations comprising:
receiving, by a centralized controller and from a client device, an indication to modify a setting of at least one database instance of a plurality of database instances at a cloud service, wherein the setting varies, at the cloud service, at least one of a memory allocation for the at least one database instance or a processor capacity for the at least one database instance;
in response to receiving the indication, triggering, by the centralized controller, a plurality of database views to obtain configuration data from a plurality of database tables at the plurality of database instances at the cloud service, wherein each of the plurality of database tables provides the configuration data for configuring a corresponding one of the plurality of database instances, wherein each of the plurality of database views provides a pre-established query in a corresponding one of the plurality of database tables to enable reception of the configuration data used to modify the setting of the at least one database instance;
receiving, by the centralized controller, the configuration data from the plurality of database tables at the plurality of database instances at the cloud service, wherein the configuration data is received via the plurality of database views on the plurality of database tables;
in response to receiving the configuration data, performing, by the centralized controller, a union view of the configuration data obtained from the plurality of database views, wherein the union view of the configuration data forms a table of configuration metadata that includes, for each of the plurality of database instances, a system identifier identifying corresponding database instance, a network identifier identifying the cloud service, the configuration data for configuring the corresponding database instance, and a group identifier indicating a group of users associated with the database instances;
storing, by the centralized controller, the union view of the configuration data in the table of the configuration metadata;
performing, by the centralized controller, an attribute view on the configuration metadata to select, based at least on the group identifier associated with the at least one database instance being modified, a subset of the configuration metadata; and
performing, by the centralized controller, at least one calculation view on the subset to modify a value of the configuration metadata and to provide the modified value to at least one of the plurality of database tables associated with the configuration of the at least one database instance at the cloud service.

9. The system of claim 8 further comprising:
receiving, from the client device, a request for monitoring information regarding the plurality of database instances at the cloud service;
providing, by the centralized controller, a response including the monitoring information; and wherein the plurality of database views are stored at the centralized controller.

10. The system of claim 8, wherein the setting varies at least one of a bandwidth of network interface, a storage amount, or a virtual machine configuration.

11. The system of claim 8, wherein the triggering the plurality of database views further comprises triggering an odata protocol command to obtain the configuration data from the plurality of database tables.

12. The system of claim 8, wherein the plurality of database instances are hosted at a plurality of cloud services.

13. The system of claim 8, wherein the updated value is provided to at least one of the plurality of database tables via an odata protocol.

14. A non-transitory computer-readable storage medium including instructions, which when executed by at least one processor, cause operations comprising:
receiving, by a centralized controller and from a client device, an indication to modify a setting of at least one database instance of a plurality of database instances at a cloud service, wherein the setting varies, at the cloud service, at least one of a memory allocation for the at least one database instance or a processor capacity for the at least one database instance;
in response to receiving the indication, triggering, by the centralized controller, a plurality of database views to obtain configuration data from a plurality of database tables at the plurality of database instances at the cloud service, wherein each of the plurality of database tables provides the configuration data for configuring a corresponding one of the plurality of database instances, wherein each of the plurality of database views provides a pre-established query in a corresponding one of the plurality of database tables to enable reception of the configuration data used to modify the setting of the at least one database instance;
receiving, by the centralized controller, the configuration data from the plurality of database tables at the plurality of database instances at the cloud service, wherein the configuration data is received via the plurality of database views on the plurality of database tables;
in response to receiving the configuration data, performing, by the centralized controller, a union view of the configuration data obtained from the plurality of database views, wherein the union view of the configuration data forms a table of configuration metadata that includes, for each of Me plurality of database instances, a system identifier identifying corresponding database instance, a network identifier identifying the cloud service, the configuration data for configuring the corresponding database instance, and a group identifier indicating a group of users associated with the database instances;

storing, by the centralized controller, the union view of the configuration data in the table of the configuration metadata;

performing, by the centralized controller, an attribute view on the configuration metadata to select, based at least on the group identifier associated with the at least one database instance being modified, a subset of the configuration metadata; and performing, by the centralized controller, at least one calculation view on the subset, to modify a value of the configuration metadata and to provide the modified value to at least one of the plurality of database tables associated with the configuration of the at least one database instance at the cloud service.

\* \* \* \* \*